United States Patent
Oroskar et al.

(10) Patent No.: US 8,620,278 B1
(45) Date of Patent: Dec. 31, 2013

(54) PRIORITIZING VOICE MAIL

(75) Inventors: Siddharth S. Oroskar, Overland Park, KS (US); Anoop K. Goyal, Overland Park, KS (US); Sachin R. Vargantwar, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 42 days.

(21) Appl. No.: 13/215,639

(22) Filed: Aug. 23, 2011

(51) Int. Cl.
*H04M 11/10* (2006.01)

(52) U.S. Cl.
USPC ............ 455/413; 455/410; 379/67.1; 379/68; 379/88.11; 379/88.12; 379/88.13; 379/88.14; 379/88.15; 379/88.16; 379/88.17; 379/88.18; 379/88.19; 379/88.2; 379/88.21; 379/88.22; 379/88.23; 379/88.24; 379/88.25; 379/88.26; 379/88.27

(58) Field of Classification Search
USPC .................... 455/410, 413; 379/67.1, 68, 379/88.11–88.27
See application file for complete search history.

(56) References Cited

U.S. PATENT DOCUMENTS

| | | | |
|---|---|---|---|
| 5,377,354 A | 12/1994 | Scannell et al. | |
| 5,966,351 A * | 10/1999 | Carleton et al. | 369/29.01 |
| 6,335,962 B1 * | 1/2002 | Ali et al. | 379/88.11 |
| 6,940,955 B1 * | 9/2005 | Jones et al. | 379/88.23 |
| 7,187,759 B2 | 3/2007 | Patel et al. | |
| 7,280,648 B2 * | 10/2007 | Matsunaga et al. | 379/142.01 |
| 7,511,603 B2 | 3/2009 | Hellebust et al. | |
| 8,019,051 B1 * | 9/2011 | Childs et al. | 379/67.1 |
| 2005/0201534 A1 * | 9/2005 | Ignatin | 379/88.22 |
| 2007/0071186 A1 * | 3/2007 | Sahasrabudhe et al. | 379/88.25 |
| 2007/0121852 A1 * | 5/2007 | Taylor et al. | 379/139 |
| 2007/0274468 A1 * | 11/2007 | Cai | 379/67.1 |
| 2008/0126951 A1 | 5/2008 | Sood et al. | |
| 2008/0259918 A1 * | 10/2008 | Walker et al. | 370/389 |
| 2009/0006085 A1 * | 1/2009 | Horvitz et al. | 704/223 |
| 2009/0245484 A1 * | 10/2009 | Bates | 379/88.19 |
| 2010/0166161 A1 * | 7/2010 | Dhawan et al. | 379/88.19 |
| 2011/0098021 A1 * | 4/2011 | Shaw et al. | 455/412.2 |

* cited by examiner

*Primary Examiner* — Liton Miah (57) ABSTRACT

In system and method of prioritizing a voice mail message, a voice mail message is received comprising caller information and chronological information, a voice mail priority is associated with the first voice mail message based on at least one of a matching criteria, a call history criteria, a chronological criteria, a frequency metric, and a missed call value, and a voice mail list is ordered according to the voice mail priority.

11 Claims, 4 Drawing Sheets

PRIORITIZING VOICE MAIL

TECHNICAL BACKGROUND

Communication networks facilitate point-to-point telephony between network endpoints. However, even in an age of widely available communication capability, including wireless communication networks, a phone call may not be answered. For example, the target device may be disconnected from a communication network, either because the device is out of range of the communication network, or because the device is turned off, and thus the target device does not signal the incoming call to a user. In addition, a user may choose not to answer an incoming call. In such cases, many communication networks provide the initiator of the call an opportunity to leave a recorded voice message, often referred to as voice mail, for the user of the target device.

The content of a voice mail message is typically not summarized or otherwise available except by listening to the message in real time. In addition, voice messages typically cannot be "skimmed" for content similar to a written document, and at least a portion of the recorded message must be listened to. Voice mail messages are also famously subject to being poorly organized, rambling, and overlong. Moreover, recorded voice messages are typically presented to a user aurally in order of receipt (for example, first-in-first-out, or first-in-last-out). Thus, the process of sorting through voice mail by a user is a laborious and, for many, an unanticipated task.

Overview

In systems and methods of prioritizing a voice mail message, a voice mail node in a wireless communication system receives a voice mail message based on a phone call from a caller to a recipient. The first voice mail message comprises caller information and chronological information. The caller information is matched to a contact entry of the recipient to generate a matching criteria. The caller information is located in a call history of the recipient to generate a call history criteria. The chronological information is compared to a first time period to generate a chronological criteria. A frequency metric is generated based on the call history of the recipient and a second time period. A first voice mail priority is associated with the first voice mail message based on at least one of the matching criteria, the call history criteria, the chronological criteria, and the frequency metric, and a voice mail list voice mail list comprising the first voice mail message is ordered according to the first voice mail priority.

DETAILED DESCRIPTION

In an embodiment, a voice mail message is received at a voice mail node of a wireless communication system, the voice mail message comprising caller information and chronological information. Various criteria and/or metrics are determined regarding the voice mail message. A voice mail priority is associated with the voice mail message based on at least one of the criteria and/or metrics, and a voice mail list comprising the voice mail message is ordered according to the voice mail priority.

Figure 1:
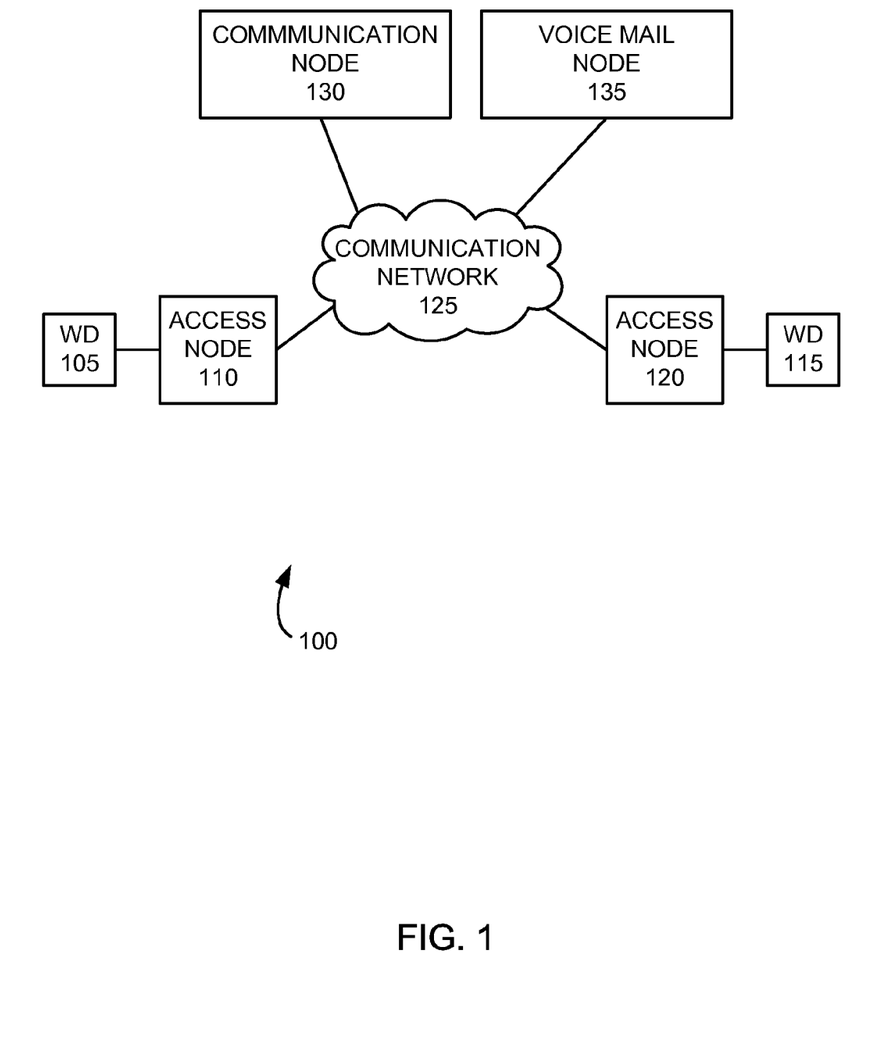
FIG. 1 illustrates an exemplary communication system.

FIG. 1 illustrates an exemplary communication system 100 comprising a first wireless device 105, a first access node 110, a second wireless device 115, a second access node 120, a communication network 125, a communication node 130, and a voice mail node 135. Other network elements may be present in the communication system 100 to facilitate wireless communication but are omitted for clarity, such as gateways, routers, mobile switching centers, and location registers such as a home location register or visitor location register. Examples of wireless devices 105 and 115 include a telephone, a computer, a personal digital assistant, an internet access device, or other device capable of wireless communication, including combinations thereof. Access node 110 communicates with wireless device 105, and access node 120 communicates with wireless device 115. An access node can be, for example, a base transceiver station or an eNodeB device.

Communication network 125 is a network or internetwork and is in communication with access nodes 110 and 120, and with communication node 130 and voice mail node 135. Communication node 130 is a network node which permits wireless devices 105 and 115 to register with a communication system. Voice mail node 135 is a network element capable of receiving voice mail, for example, intended for a user of a wireless device such as wireless devices 105 and 115, and is further configured to prioritize voice mail as further described below. Wireless devices 105 and 115, access nodes 110 and 120, communication network 125, communication node 130 and voice mail node 135 each communicate over wired or wireless communication links or combinations thereof. Wired communication links can be, for example, twisted pair cable, coaxial cable or fiber optic cable, or combinations thereof. Wireless communication links can be a radio frequency, microwave, infrared, or other similar signal. Wireless communications links can use a suitable communication format, for example, Global System for Mobile telecommunications (GSM), Code Division Multiple Access (CDMA), Evolution-Data Optimized (EV-DO), Worldwide Interoperability for Microwave Access (WiMAX), or Long Term Evolution (LTE), or combinations thereof. Other communication formats can also be used.

Figure 2:
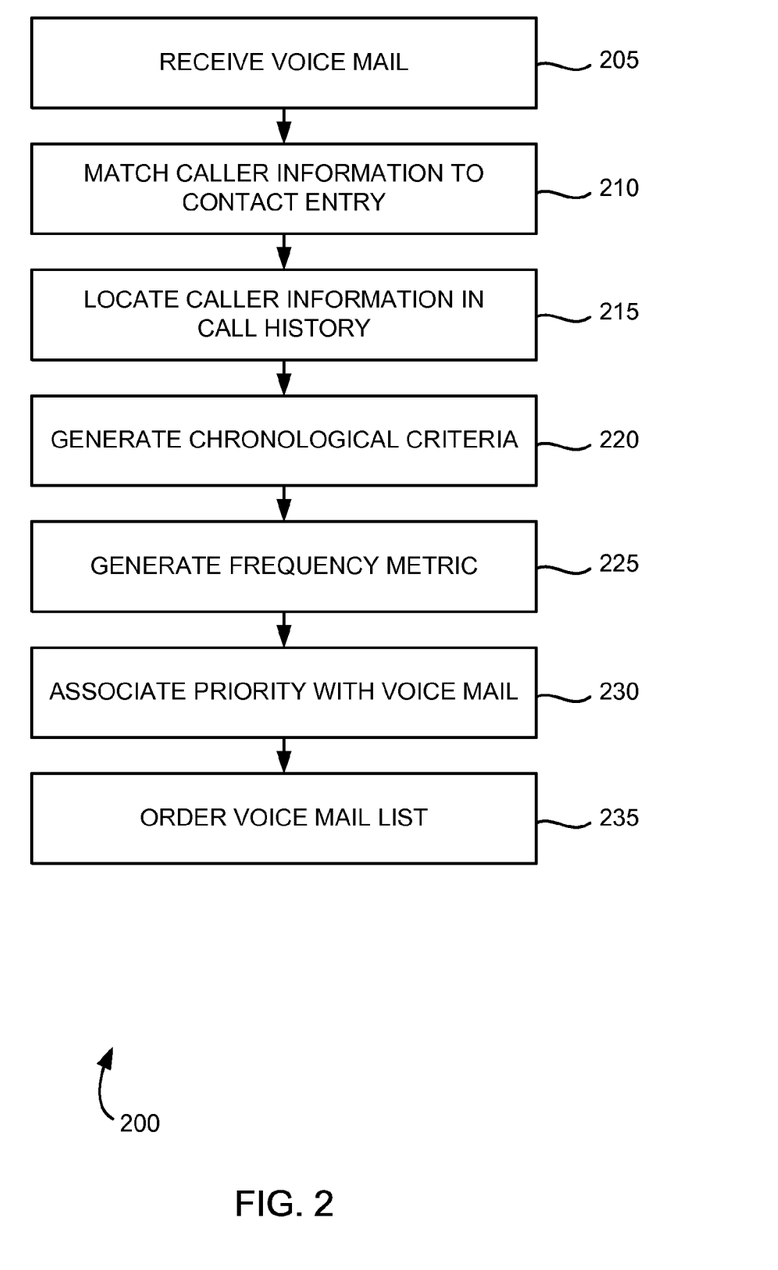
FIG. 2 illustrates an exemplary method of prioritizing a voice mail.

FIG. 2 illustrates an exemplary method of prioritizing a voice mail. In operation 205, a voice mail message is received by a voice mail node, such as voice mail node 135. For example, wireless device 105 can place a call to wireless device 115 using communication system 100. Wireless device 115 may not answer the call, for example, because wireless device 115 is not connected to communication system 100 at the time the call comes in. For example, wireless device 115 may be temporarily out of communication with access node 120. Alternatively, wireless device 115 may have been turned off, or a user of wireless device 115 may simply not answer the incoming call. After, for example, a predetermined period of time, or a predetermined number of rings, or some other predetermined event, voice mail node 135 can provide wireless device 105 with a notification, such as a message, indicating that wireless device 105 may record a voice message for wireless device 115, and wireless device 105 transmits a voice message to voice mail node 135. In operation 205, the voice mail message is received at voice mail node 135. The voice mail comprises a recorded message, and further comprises caller information and chronological information. The caller information is an indicator of an identity of the calling device 105. The chronological information is typically a date and/or time of the voice message. The chronological information can reflect the date and time that the voice mail received by wireless device 115, or it can reflect the date and time that the voice mail is received at voice mail node 135. Other times and dates are also possible.

Voice mail node 135 is capable of prioritizing the voice mail according to criteria and metrics. In operation 210, the caller information is matched with a contact entry of the receiving wireless device. Wireless device 115 can store or have access to a contact list. The contact list can be a list of identifiers of wireless devices which are associated with, for example, family members, business contacts, friends, and the like. A contact list can be stored on wireless device 115, and/or it can be stored on a network node such as communication node 130, voice mail node 135, or another network element such as a home location register or the equivalent (not illustrated). Synchronization of a contact list between wireless device 115 and network storage is also possible. When the caller information matches contact information of an entry in the contact list of wireless device 115, the voice mail can be assigned a higher priority. Assigning a higher priority can include, for example, increasing a priority value.

The extent that the priority of the voice mail is increased can vary according to the contact. For example, a contact list entry can include an indication that the contact is a high priority contact, for example, a spouse, or a business contact. Many methods can be used to indicate a priority level of a contact. For example, a numerical assignment can be made for each contact, such as from 1 to 5 in increasing order of priority, so that a contact at the highest level of priority, such as a spouse, can be indicated as a 5, a business contact can be indicated as a 4, a close friend can be indicated as a 3, and so forth. Other methods of indicating a priority level of a contact are possible, such as alphabetical characters (A level, B level, etc.), other alphanumeric characters (for example, "!" indicating a high priority contact), and color coding (for example, a red-colored priority label could indicate a high priority contact). According to the level of priority indicated by the contact entry, the priority of the voice mail can be increased by a greater or lesser extent, or not changed (for example, in the case of a low priority contact). It is also possible to use the priority indication of a contact to deemphasize a contact, in which case the priority of the voice mail could be lowered.

In operation 215, voice mail node 135 attempts to locate the caller information in a call history of receiving wireless device 115. A record of call activity of wireless device 115, including inbound calls, outbound calls, and/or missed calls, can be kept. The history of call activity can be stored on wireless device 115 and provided to voice mail node 130, or the call history can be stored on a network node such as communication node 130, voice mail node 135, or another network element such as a home location register or the equivalent (not illustrated). When the caller information is located in the call history, the priority of a voice mail recorded by the caller can be increased.

In operation 220, the chronological information of the voice mail is compared to a first time period to generate a chronological criteria. The chronological criteria is generated based on whether the voice mail is received within or outside of the first time period. The first time period can be, for example, a period of time extending from the time the voice mail is received back in time (such as a period of hours, days, or weeks). The first time period can be determined by the network or by a user of wireless device 115. The first time period can also be a discrete period, such as a particular weekend, or a period when a user of wireless device 115 is on vacation. When the chronological information falls within the first time period, the chronological criteria is generated to so indicate, and the priority of the voice mail can be increased according to the chronological criteria. Thus, voice mail node 135 can increase the priority of a voice mail when it is received within an indicated time period.

In operation 225, when the caller information is located in the call history, the number of times that the caller information appears in the call history is compared to a second time period to generate a frequency metric. The second time period can be, for example, a period of time extending from the time the voice mail is received back in time (such as a period of hours, days, or weeks). The second time period can be determined by the network or by a user of wireless device 115. The second time period can also be a discrete period, such as a particular weekend, or a period when a user of wireless device 115 is on vacation. Based on the number of times the caller information appears in the call history during the second time period, a frequency metric will be generated accordingly. Based on the frequency metric, the priority of the voice mail can be increased. In addition, the priority of the voice mail can be increased to a greater or lesser extent according to the number of times that the caller information appears in the call history during the second time period. For example, when the caller information appears several times in a past 48-hour period, voice mail node 135 can greatly increase the priority of a voice mail. As another example, when the caller information appears infrequently, or not at all, the priority of the voice mail may be increased to a lesser extent, or not at all, according to the frequency metric.

In operation 230, voice mail node 135 associates a voice mail priority with the voice mail based on at least one of the matching criteria, the call history criteria, the chronological criteria, and the frequency metric. The matching criteria, the call history criteria, the chronological criteria, and the frequency metric can be used alone or in some combination to determine the voice mail priority associated with the voice mail. In addition, different weighting can be given to each criteria and metric, so that the priority associated with the voice mail can be made to emphasize one or more of the criteria and/or metric. When the priority is associated with the voice mail, a voice mail list comprising the voice mail message is ordered according to the priority assigned to the voice mail. In the case where there are multiple voice mail messages recorded, voice mail node 135 will order the multiple voice mail messages according to the respective associated priority, thus providing a list of pending voice mail in order of importance. A user can retrieve the pending voice mail in any order, for example, in order of highest-to-lowest priority, or in any other order. For example, a user may select low priority voice mail first, on the presumption that high priority voice mail requires more attention and that low priority voice mail can be addressed more quickly or easily. In addition, some or all voice mail of a particular priority can be selected.

Figure 3:
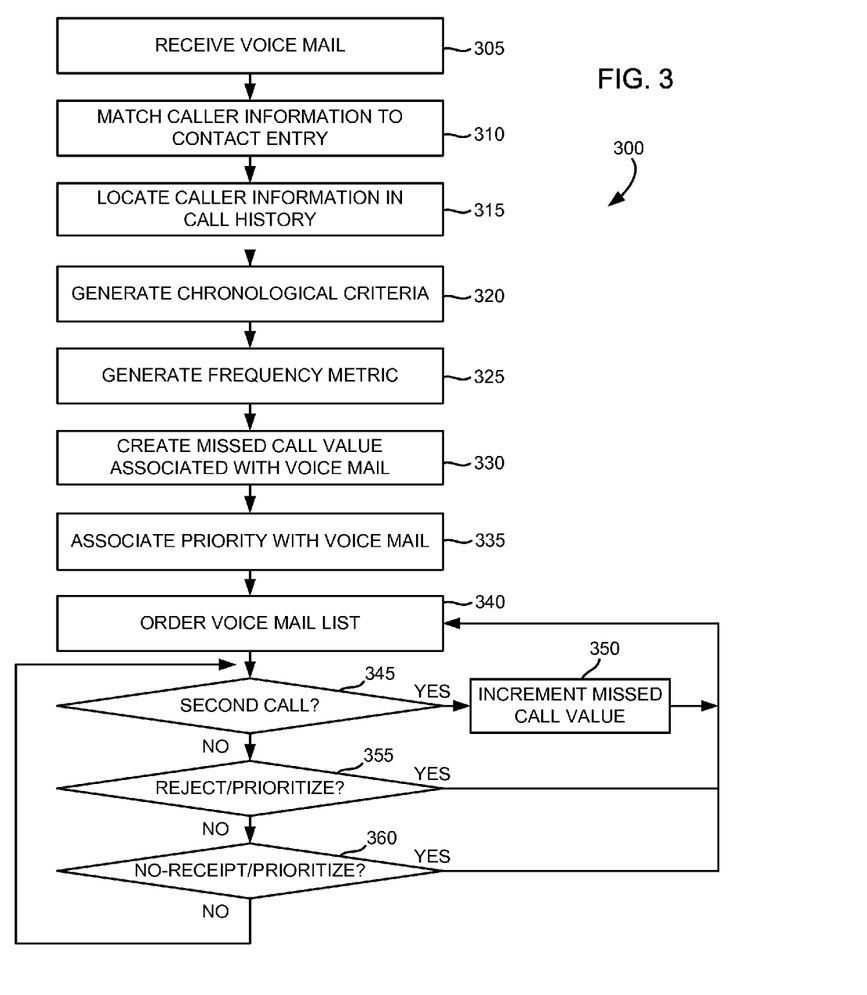
FIG. 3 illustrates another exemplary method of prioritizing a voice mail.

FIG. 3 illustrates another exemplary method of prioritizing a voice mail. In operation 305, a voice mail is received by a voice mail node, such as voice mail node 135. For example, wireless device 105 can place a call to wireless device 115 through communication system 100. Wireless device 115 may not answer the call, the voice mail node 135 can provide wireless device 105 with a notification indicating that wireless device 105 may record a voice message for wireless device 115, and wireless device 105 transmits a voice message to voice mail node 135. In operation 305, the voice mail message is received at voice mail node 135. The voice mail comprises a recorded message, and further comprises caller information and chronological information. The caller information is an indicator of an identity of calling device 105. The chronological information is typically a date and/or time of the voice message. The chronological information can reflect the date and time that the voice mail is sent from wireless device 105, or it can reflect the date and time that the voice mail is received at voice mail node 135. Other times and dates are also possible.

In operation 310, the caller information is matched with a contact entry of the receiving wireless device. Wireless device 115 can store or have access to a contact list, such as, wireless devices which are associated with, for example, family members, business contacts, friends, and the like. A contact list can be stored on the wireless device 115, and/or it can be stored on a network node such as communication node 130, voice mail node 135, or another network element such as a home location register or the equivalent (not illustrated). Synchronization of a contact list between wireless device 115 and network storage is also possible. When the caller information matches contact information of an entry in the contact list of wireless device 115, the priority assigned to the voice mail can be increased. Assigning a higher priority can include, for example, increasing a priority value.

The extent that the priority of the voice mail is increased can vary according to the contact. For example, the contact entry can include an indication that the contact is a high priority contact, for example, a spouse, or a business contact. According to the level of priority indicated by the contact entry, the priority of the voice mail can be increased by a greater or lesser extent, or not changed (for example, in the case of a low priority contact). It is also possible to use the priority indication of a contact to deemphasize a contact, in which case the priority of the voice mail could be lowered.

In operation 315, voice mail node 135 attempts to locate the caller information in a call history of the receiving wireless device 115. A record of call activity of wireless device 115, including inbound calls, outbound calls, and/or missed calls, can be kept. The history of call activity can be stored on wireless device 115 and provided to voice mail node 130, or the call history can be stored on a network node such as the communication node 130, voice mail node 135, or another network element such as a home location register or the equivalent (not illustrated). When the caller information is located in the call history, the priority assigned to the voice mail recorded by the caller can be increased.

In operation 320, the chronological information of the voice mail is compared to a first time period to generate a chronological criteria. The chronological criteria is generated based on whether the voice mail is received within or outside of the first time period. The first time period can be, for example, a period of time extending from the time the voice mail is received back in time (such as a period of hours, days, or weeks). The first time period can be determined by the network or by a user of wireless device 115. The first time period can also be a discrete period, such as a particular weekend, or a period when a user of wireless device 115 is on vacation. When the chronological information falls within the first time period, the chronological criteria is generated to so indicate, and the priority of the voice mail can be increased according to the chronological criteria. Thus, voice mail node 135 can increase the priority of a voice mail when it is received within an indicated time period.

In operation 325, when the caller information is located in the call history, the number of times that the caller information appears in the call history is compared to a second time period to generate a frequency metric. The second time period can be, for example, a period of time extending from the time the voice mail is received back in time (such as a period of hours, days, or weeks). The second time period can be determined by the network or by a user of wireless device 115. The second time period can also be a discrete period, such as a particular weekend, or a period when a user of wireless device 115 is on vacation. In operation, the time period can be set to any time period, including no time period (i.e., the time period need not be bounded at some point in the past). Based on the number of times the caller information appears in the call history during the second time period, a frequency metric will be generated accordingly. Based on the frequency metric, the priority of the voice mail can be increased. In addition, the priority of the voice mail can be increased to a greater or lesser extent according to the number of times that the caller information appears in the call history during the second time period. For example, when the caller information appears several times in the past 48-hour period, voice mail node 135 will greatly increase the priority of a voice mail. As another example, when the caller information appears infrequently, or not at all, the priority of the voice mail may be increased to a lesser extent, or not at all, according to the frequency metric.

In operation 330, a missed call value is created and is associated with the voice mail message. The missed call value can be used to indicate an increased priority associated with the voice mail message, as will be further described below.

In operation 335, voice mail node 135 associates a voice mail priority with the voice mail based on at least one of the matching criteria, the call history criteria, the chronological criteria, the frequency metric, and the missed call value. The matching criteria, the call history criteria, the chronological criteria, the frequency metric, and the and the missed call value can be used alone or in some combination to determine the voice mail priority associated with the voice mail. In addition, different weighting can be given to each criteria and metric, so that the priority associated with the voice mail can be made to emphasize one or more of the criteria and/or metric. When the priority is associated with the voice mail, a voice mail list comprising the voice mail message is ordered according to the priority assigned to the voice mail. In the case where there are multiple voice mail messages recorded, voice mail node 135 will order the multiple voice mail messages according to the respective associated priority, thus providing a list of pending voice mail in order of importance. A user can retrieve the pending voice mail in any order, for example, in order of highest-to-lowest priority, or in any other order. For example, a user may select low priority voice mail first, on the presumption that high priority voice mail requires more attention and that low priority voice mail can be addressed more quickly or easily. In addition, some or all voice mail of a particular priority can be selected.

In operation 345, the recipient places a phone call to the caller based on the first voice mail message (in other words, a second phone call), which the caller does not answer. For example, after listening to the voice mail message to the caller, the recipient may make phone call to the recipient. Communication system 100 may, for example, provide an option from voice mail node 135 to call the wireless device which left the voice mail message (i.e., wireless device 105). As another example, wireless device 115 may call wireless device 105, and because the second call is within a predetermined time period after the voice mail message is received, the second call is considered to be based on the voice mail message and/or to the first phone call. Thus, in operation 345, the recipient of the voice mail makes a phone call to wireless device 105.

If the caller (i.e., the user of wireless device 105, who receives the second phone call) answers the call, a communication session is set up between wireless devices 105 and 115 and the call proceeds. If the caller does not answer the second phone call from the recipient, the recipient may receive an indication, for example, after a predetermined period of time, or a predetermined number of rings, or some other predetermined event, that wireless device 115 may record a voice message for wireless device 105, and wireless device 115 transmits a voice message (that is, a second voice mail message) to voice mail node 135. If there is a missed call (operation 345-YES), when voice mail node 135 receives the voice message from wireless device 115, the missed call value can be incremented (operation 350). When the missed call value is incremented, the priority of the first voice mail message can be increased based on the missed call value, and the voice mail list can be re-ordered based on the increased priority of the first voice mail message. That is, whether or not the recipient has listened to the first voice mail message, if the first voice mail message remains in the voice mail list (for example, if the recipient has not deleted the first voice mail message) the priority of the first voice mail message can be increased and the voice mail list can be re-ordered to reflect the increased priority of the first voice mail message.

In addition, when the second voice mail is received by voice mail node 135, a second voice mail priority can be associated with the second voice mail based on the increased priority of the first voice mail. For example, in a situation where a caller and a recipient repeatedly attempt to call each other without reaching the other party (sometimes referred to as "phone tag"), the priority of a voice mail message left by the caller for the recipient, and the priority of a voice mail message left by the recipient for the caller, can both be increased based on the missed calls and/or voice mail messages left by each party for the other. Accordingly, when two parties attempt to call each other repeatedly, the parties' respective voice mail messages can be increasingly prioritized.

Additional criteria can also be used to change the priority of a voice mail message. For example, when wireless device 115 provides an indication of an incoming call, a user may elect to send the incoming call directly to voice mail (operation 355). For example wireless device 115 can receive an input indicating that the received call should be directed to the voice mail system. Wireless device 115 can also provide an indication that a voice mail message left by the incoming caller should be given increased priority, referred to herein as a reject/prioritize indication. In operation 355, based on, for example, an input received at wireless device 115, a voice mail will be associated with a reject/prioritize indication, and the voice mail will be given an increased priority based on the reject/prioritize indication. The reject/prioritize indication can be associated with the voice mail message, for example, when a call is received at wireless device 115 and an input is received to send the call to voice mail and to prioritize any voice mail message left by the caller. The reject/prioritize indication can also be associated with the voice mail after a voice mail has been received, for example, when the voice mail list is being reviewed. In other words, a voice mail message in the voice mail list can be given increased (or decreased) priority when the voice mail list is being reviewed, regardless of whether a phone call is incoming. When a reject/prioritize indication is associated with the voice mail (operation 355-YES), the voice mail list is re-ordered accordingly.

Wireless device 115 may also not answer an incoming call because wireless device 115 did not receive an indication of the call when it was made. For example, the wireless device may be temporarily out of connection with a communication network, for example, because it is in an area of insufficient service or no service, or because the device is turned off. Also, network congestion in the communication network may, for example, require the network to deny network or air interface resources to wireless device 115. In such case, although an incoming call for wireless device 115 is received by the communication network, wireless device 115 is not notified of the call. Voice mail received under such circumstances can be given increased priority. In operation 360, a voice mail will be associated with an indication referred to as a no-receipt/prioritize indication, and the voice mail will be given an increased priority based on the no-receipt/prioritize indication. When a no-receipt/prioritize indication is associated with the voice mail (operation 360-YES), the voice mail list can be re-ordered accordingly.

Figure 4:
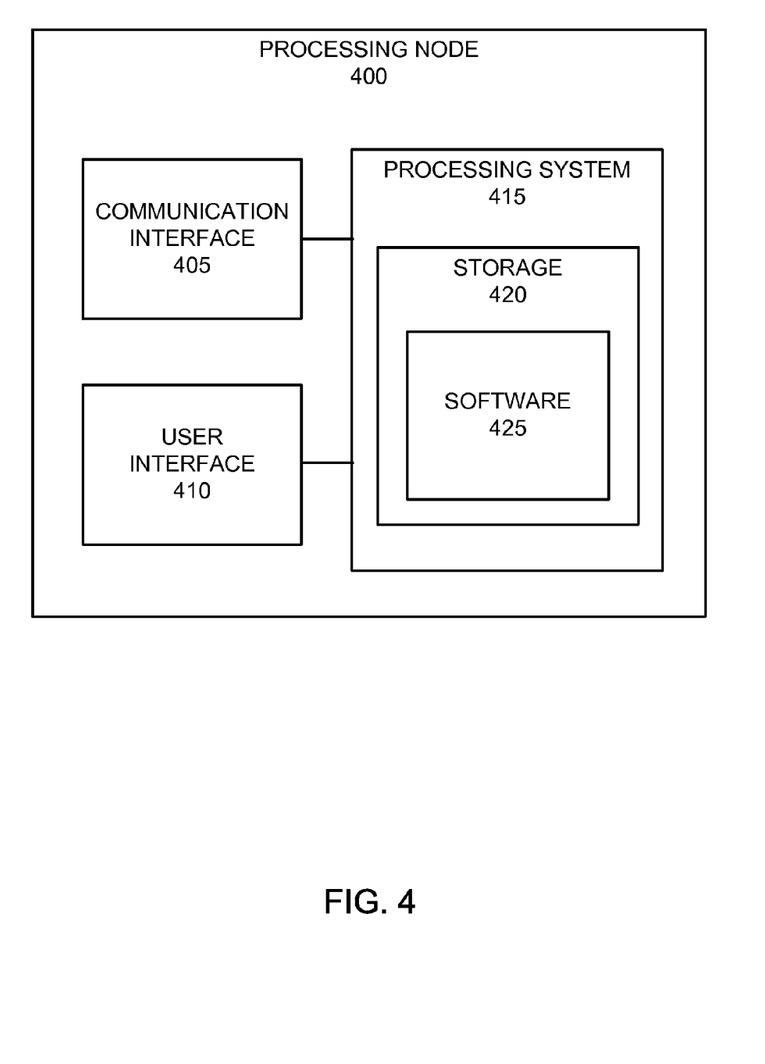
FIG. 4 illustrates an exemplary processing node.

FIG. 4 illustrates an exemplary processing node 400. Processing node 400 is an example of voice mail node 135 illustrated in FIG. 1, and thus a communication system such as communication system 100 comprises a processing node such as processing node 400. Processing node 400 can, among other things, receive voice mail messages and prioritize received voice mail messages according to criteria and metrics. Processing node 400 can include a communication interface 405 and a user interface 410, each in communication with a processing system 415. Communication interface 405 can permit the processing node 400 to communicate with one or more elements of a communication system, such wireless devices 105 and 115 via access nodes 110 and 115 and communication network 125, as well as communication node 130.

Processing system 415 can include storage 420. Storage 420 comprises a disk drive, flash drive, memory circuitry, or other memory device. Storage 420 can store software 425 which is used in the operation of the processing node 400. Software 425 may include an operating system, utilities, drivers, network interfaces, applications, or some other type of software. User interface 410 can permit a user to configure and control the operation of the processing node 400. Processing system 415 can be mounted on a circuit board that may also include storage 420 and portions of communication interface 405. When executed by processing system 415, software 425 directs processing system 415 to operate processing node 400 as described herein for voice mail node 135.

Some or all of the actions described herein can be performed under the control of a computer system executing computer-readable codes embedded on a computer-readable recording medium or on communication signals transmitted through a transitory medium. The computer-readable recording medium may include any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The communication signals transmitted through a transitory medium may include, for example, signals which modulate carrier waves transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of prioritizing a voice mail message, comprising:
receiving at a voice mail node in a wireless communication system a first voice mail message based on a first phone call from a caller to a recipient, the first voice mail message comprising caller information and chronological information;
matching the caller information to a contact entry of the recipient to generate a matching criteria;
locating the caller information in a call history of the recipient to generate a call history criteria;
comparing the chronological information to a first time period to generate a chronological criteria;
generating a frequency metric based on the call history of the recipient and a second time period;
creating a missed call value associated with the voice mail message;
associating a first voice mail priority with the first voice mail message based on the matching criteria, the call history criteria, the chronological criteria, and the frequency metric;
ordering a voice mail list comprising the first voice mail message according to the first voice mail priority;
incrementing the missed call value when the recipient places a second phone call to the caller based on the first voice mail message wherein the caller does not answer the second phone call;
increasing the first voice mail priority associated with the first voice mail message based on the missed call value;
incrementing the missed call value when the recipient places a second phone call to the caller based on the first voice mail message wherein the caller does not answer the second phone call; and
increasing the first voice mail priority associated with the first voice mail message based on the missed call value.

2. The method of claim 1, wherein the first voice mail message further comprises a reject/prioritize indication that the first phone call was rejected and that the first voice mail message is to be prioritized.

3. The method of claim 2, further comprising:
increasing the first voice mail priority based on the reject/prioritize indication.

4. The method of claim 1, wherein the first voice mail message further comprises a no-receipt/prioritize indication that a wireless device of the recipient did not receive the first phone call due to one of network congestion and a lack of a connection between the wireless device of the recipient and the wireless communication system.

5. The method of claim 4, further comprising:
increasing the first voice mail priority based on the no-receipt/prioritize indication.

6. A voice mail node of a wireless communication system, comprising:
a communication interface to receive a first voice mail message based on a first phone call from a caller to a recipient, the first voice mail message comprising caller information and chronological information, and a second voice mail message based on the second phone call from the recipient to the caller; and
a processor configured to
match the caller information to a contact entry of the recipient to generate a matching criteria,
locate the caller information in a call history of the recipient to generate a call history criteria,
compare the chronological information to a first time period to generate a chronological criteria,
generate a frequency metric based on the call history of the recipient and a second time period,
create a missed call value associated with the voice mail message,
associate a first voice mail priority with the first voice mail message based on the matching criteria, the call history criteria, the chronological criteria, and the frequency metric,
order a voice mail list comprising the first voice mail message according to the voice mail priority,
increment the missed call value when the recipient places a second phone call to the caller based on the first voice mail message wherein the caller does not answer the second phone call,
increase the first voice mail priority associated with the first voice mail message based on the missed call value, and
associate with the second voice mail message a second voice mail priority based on the increased first voice mail priority.

7. The voice mail node of claim 6, wherein the first voice mail message further comprises a reject/prioritize indication that the first phone call was rejected and that the first voice mail message is to be prioritized.

8. The voice mail node of claim 7, wherein the processor is further configured to:
increase the first voice mail priority based on the reject/prioritize indication.

9. The voice mail node of claim 6, wherein the first voice mail message further comprises a no-receipt/prioritize indication that a wireless device of the recipient did not receive the first phone call due to one of network congestion and a lack of a connection between the wireless device of the recipient and the wireless communication system.

10. The voice mail node of claim 9, wherein the processor is further configured to:
increase the first voice mail priority based on the no-receipt/prioritize indication.

11. A method of prioritizing a voice mail message, comprising:
receiving at a voice mail node in a wireless communication system a first voice mail message based on a first phone call from a caller to a recipient, the first voice mail message comprising caller information and chronological information;
matching the caller information to a contact entry of the recipient to generate a matching criteria;
locating the caller information in a call history of the recipient to generate a call history criteria;
comparing the chronological information to a first time period to generate a chronological criteria;
generating a frequency metric based on the call history of the recipient and a second time period;
creating a missed call value associated with the voice mail message;
associating a first voice mail priority with the first voice mail message based on the matching criteria, the call history criteria, the chronological criteria, the frequency metric, and the missed call value;
ordering a voice mail list comprising the first voice mail message according to the first voice mail priority;
incrementing the missed call value when the recipient places a second phone call to the caller based on the first voice mail message wherein the caller does not answer the second phone call;
increasing the first voice mail priority associated with the first voice mail message based on the missed call value; and reordering the voice mail list comprising the first voice mail message according to the increased first voice mail priority.

\* \* \* \* \*